(12) United States Patent
Calciu et al.

(10) Patent No.: US 10,887,237 B2
(45) Date of Patent: Jan. 5, 2021

(54) ADVANCED LOAD BALANCING BASED ON BANDWIDTH ESTIMATION

(71) Applicant: LENOVO Enterprise Solutions (Singapore) PTE. LTD., New Tech Park (SG)

(72) Inventors: Corneliu-Ilie Calciu, Bucharest (RO); Radu Mihai Iorga, Bucharest (RO)

(73) Assignee: LENOVO Enterprise Solutions (Singapore) PTE. LTD, New Tech Park (SG)

( * ) Notice: Subject to any disclaimer, the term of this patent is extended or adjusted under 35 U.S.C. 154(b) by 0 days.

(21) Appl. No.: 16/368,661

(22) Filed: Mar. 28, 2019

(65) Prior Publication Data

US 2020/0314014 A1 Oct. 1, 2020

(51) Int. Cl.
*H04L 12/803* (2013.01)
*H04L 12/801* (2013.01)
*H04L 12/26* (2006.01)
*H04L 12/825* (2013.01)

(52) U.S. Cl.
CPC ........ *H04L 47/125* (2013.01); *H04L 43/0882* (2013.01); *H04L 43/16* (2013.01); *H04L 47/196* (2013.01); *H04L 47/26* (2013.01); *H04L 47/193* (2013.01)

(58) Field of Classification Search
CPC ..... H04L 43/0882; H04L 43/16; H04L 43/08; H04L 47/125; H04L 47/193; H04L 47/196; H04L 47/26
USPC ........................................................ 370/235
See application file for complete search history.

(56) References Cited

U.S. PATENT DOCUMENTS

| 7,974,202 | B2* | 7/2011 | Solomon | H04L 45/50 370/235 |
| 8,427,946 | B2* | 4/2013 | Weiss | H04L 47/10 370/230 |
| 8,477,616 | B1* | 7/2013 | Rogers | H04L 47/70 370/235 |
| 2005/0044221 | A1* | 2/2005 | Venkatanarayan | H04L 67/1002 709/225 |
| 2008/0198747 | A1* | 8/2008 | Young | H04L 41/5003 370/232 |
| 2010/0128619 | A1* | 5/2010 | Shigei | H04L 12/1877 370/252 |

(Continued)

*Primary Examiner* — Rownak Islam
(74) *Attorney, Agent, or Firm* — Kunzler Bean & Adamson; Bruce R. Needham

(57) ABSTRACT

An apparatus for load balancing based on available bandwidth estimation includes a bandwidth module configured to determine for a networking device a first available bandwidth estimate for a first egress port and a second available bandwidth estimate for a second egress port, a load balancing module configured to select the first egress port as a selected port in response to determining that the first available bandwidth estimate of the first egress port exceeds a predetermined level and to select the second egress port as the selected port in response to determining that the available bandwidth estimate of the first egress port does not exceed the predetermined level and that the second available bandwidth estimate of the second egress port exceeds the predetermined level, and a transmission module configured to transmit a packet from the selected port. A method and network switching device work similarly to the apparatus.

19 Claims, 5 Drawing Sheets

(56) References Cited

U.S. PATENT DOCUMENTS

2012/0218896 A1* 8/2012 Ygberg .............. H04L 41/0816
    370/235
2013/0336104 A1* 12/2013 Talla .................... H04L 45/245
    370/216

* cited by examiner

ADVANCED LOAD BALANCING BASED ON BANDWIDTH ESTIMATION

FIELD

The subject matter disclosed herein relates to network switching devices and more particularly relates to advanced load balancing based on bandwidth estimation in a network switching device.

BACKGROUND

Network switching devices enable packets received from individual network devices such as servers to be forwarded to other network devices. Multiple network connections or ports may be combined in a link aggregation group in order to increase throughput beyond what a single network connection could sustain. Some network switching devices attempt to balance the packet traffic load on each network connection or port within a group of combined or aggregated network connections or ports. Some common types of network traffic are not optimally balanced by load balancing algorithms that rely on data entropy to enable distribution of the packets equally across members of the link aggregation group.

BRIEF SUMMARY

An apparatus for advanced load balancing based on bandwidth estimation is disclosed. A method and system also perform the functions of the apparatus. In one embodiment, the apparatus includes a bandwidth module configured to determine a first available bandwidth estimate for a first egress port and for a second egress port. In one embodiment, the apparatus includes a load balancing module configured to select the first egress port as a selected port in response to determining that the first available bandwidth estimate of the scheduled port exceeds a predetermined level, and to select the second egress port as the selected port in response to determining that the available bandwidth estimate of the first egress port does not exceed the predetermined level and that the second available bandwidth estimate of the second egress port exceeds the predetermined level. The apparatus further includes, in one embodiment, a transmission module configured to transmit the packet from the selected port.

In one embodiment, a method includes receiving a packet at an ingress port of a networking device. The method includes determining a first available bandwidth estimate of the first egress port. The method includes selecting the first egress port as a selected port in response to determining that the first available bandwidth estimate of the first egress port exceeds a predetermined level. The method further includes selecting a second egress port as the selected port in response to determining that the first available bandwidth estimate of the scheduled port does not exceed the predetermined level and to further determining that the second egress port has a second available bandwidth estimate that exceeds the predetermined level, and transmitting the packet from the selected port.

In one embodiment, a network switching device includes an ingress port, a plurality of egress ports, a first circuit configured to receive a networking packet, a second circuit configured to configure the plurality of egress ports as members of a link aggregation group, a third circuit configured to determine a first available bandwidth estimate of a first egress port of the plurality of egress ports, a fourth circuit configured to select the first egress port as a selected port in response to determining that the first available bandwidth estimate of the first egress port exceeds a predetermined level, a fifth circuit configured to select a second egress port from the plurality of egress ports as the selected port in response to determining that the first available bandwidth estimate of the first egress port does not exceed the predetermined level, the second egress port having a second available bandwidth estimate that exceeds the predetermined level, and a sixth circuit configured to transmit the packet from the selected port.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
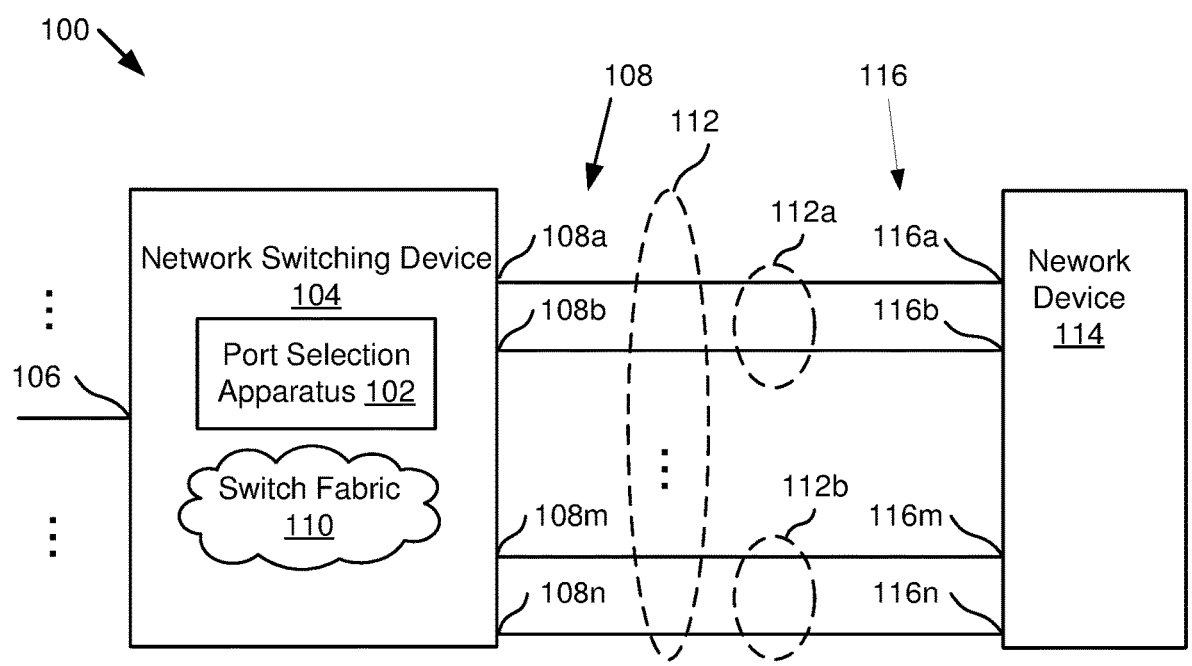
FIG. 1 is a schematic block diagram illustrating one embodiment of a system for advanced load balancing in a network switch device based on bandwidth estimation.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise.

The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for advanced load balancing based on bandwidth estimation includes a bandwidth module configured to determine a first available bandwidth estimate for a first egress port of a networking device and to determine a second available bandwidth estimate for a second egress port of the networking device, a load balancing module configured to select the first egress port as a selected port in response to determining that the first available bandwidth estimate of the first egress port exceeds a predetermined level, and to select the second egress port as the selected port in response to determining that the available bandwidth estimate of the first egress port does not exceed the predetermined level and that the second available bandwidth estimate of the second egress port exceeds the predetermined level, an a transmission module configured to transmit a packet from the selected port.

In certain environments, the load balancing module is configured to determine whether the packet is configured to use a reliable transport protocol as a condition to selecting the second egress port as the selected port. In some embodiments, the reliable transport protocol is one of Transmission Control Protocol ("TCP") and Stream Control Transmission Protocol ("SCTP"). In various embodiments, the apparatus further includes a switching logic module configured to cause an action selected from dropping the packet and using flow control to pause receipt of further packets, to be performed in response to one or more of determining that the available bandwidth estimate of first egress port each egress port of a plurality of egress ports including the first egress port and the second egress port does not exceed the predetermined level and/or determining that the packet is not configured to use a reliable transport protocol.

In some embodiments, the bandwidth module is configured to determine the available bandwidth estimate for the selected port based on a size of currently available memory in a queue for the selected port at a current rate of packet traffic for the selected port. In certain embodiments, the bandwidth module is configured to decrease the available bandwidth estimate of the selected port by a packet size of the packet in response the selected port being selected. In various embodiments, the bandwidth module is configured to increase the available bandwidth estimate of the selected port by a packet size of the packet in response to the packet being transmitted from the selected port.

In some embodiments, the bandwidth module is configured to determine the packet size by parsing a packet header of the packet before scheduling the packet for layer 2 or layer 3 processing. In various embodiments, the load balancing module is configured to select the second egress port as the selected port by determining which of a plurality of egress ports has the greatest available bandwidth estimate at a receipt time of the packet being received at an ingress port. In certain embodiments, the load balancing module is configured to determine the second egress port by incrementing a port number to the port number of a next available egress port whose available bandwidth estimate exceeds the predetermined level. In some embodiments, the apparatus includes a scheduling module configured to schedule the first egress port using a hash of at least one field of a packet header of the packet. In various embodiments, the plurality of egress ports are bundled together to form a link aggregation group selected from a static link aggregation group and a dynamic link aggregation group.

A method for advanced load balancing based on bandwidth estimation includes receiving first egress port a packet at an ingress port of a networking device, determining a first available bandwidth estimate of a first egress port, selecting the first egress port as a selected port in response to determining that the first available bandwidth estimate of the first egress port exceeds a predetermined level, selecting a second egress port as the selected port in response to determining that the first available bandwidth estimate of the first egress port does not exceed the predetermined level and to further determining that the second egress port has a second available bandwidth estimate that exceeds the predetermined level, and transmitting the packet from the selected port.

In some embodiments, the method further includes causing an action selected from dropping the packet and using flow control to pause receipt of further packets, to be performed in response to one or more of determining that the available bandwidth estimate of first egress port each egress port of a plurality of egress ports including the first egress port and the second egress port does not exceed the predetermined level and/or determining that the packet is not configured to use a reliable transport protocol. In various embodiments, the method determines the available bandwidth estimate for the selected port is based on a size of currently available memory in a queue for the selected port at a current rate of packet traffic for the selected port.

In certain embodiments, the method decreases the available bandwidth estimate of the selected port by a packet size of the packet in response to the selected port being selected. In various embodiments the method increases the available bandwidth estimate of the selected port by a packet size of the packet in response to the packet being transmitted from the selected port. In some embodiments, the method selects the second egress port by determining which of a plurality of egress ports including the first egress port and the second egress port has the greatest available bandwidth estimate at a receipt time of the packet being received at the ingress port. In certain embodiments, the method the second egress port by incrementing a port number to the port number of a next available egress port.

In one embodiment, a network switching device includes an ingress port, a plurality of egress ports, a first circuit configured to receive a networking packet, a second circuit configured to configure the plurality of egress ports as members of a link aggregation group, a third circuit configured to determine a first available bandwidth estimate of a first egress port of the plurality of egress ports, a fourth circuit configured to select the first egress port as a selected port in response to determining that the first available bandwidth estimate of the first egress port exceeds a predetermined level, a fifth circuit configured to select a second egress port from the plurality of egress ports as the selected port in response to determining that the first available bandwidth estimate of the first egress port does not exceed the predetermined level, the second egress port having a second available bandwidth estimate that exceeds the predetermined level, and a sixth circuit configured to transmit the networking packet from the selected port.

FIG. 1 is a schematic block diagram illustrating one embodiment of a system 100 for advanced load balancing in a network switch device 104 based on bandwidth estimation. The system 100 includes a port selection apparatus 102 in a network switching device 104 with one or more ingress ports 106 and a plurality of egress ports 108 (referred to individually as 108*a*, 108*b*, 108*c* and so forth to 108*n*). The network switching device 104 also includes switch fabric 110 which operates to propagate each frame from the ingress port 106 to the egress ports 108. The egress ports 108*a*, 108*b*, . . . 108*m*, 108*n* can connect to similar input ports 116*a*, 116*b*, . . . 116*m*, 116*n* of a network device 114. The network device 114 may be a switch, router, controller, or any network device that is configured to communicate over multiple physical links. The port selection apparatus 102 is described in more detail with regard to the apparatuses 200, 300 of FIGS. 2 and 3.

In one embodiment, two or more of the plurality of the physical links (e.g., egress ports 108) between the network switching device 104 and the network device 114 are aggregated or group together to form a link aggregation group ("LAG") 112 in which multiple physical interfaces are bundled together to form a logical link, or multiple logical links. The link aggregation group 112 provides increased bandwidth relative to the bandwidth that would be available using a single link e.g., from egress port 108*n*.

Additionally, in some embodiments, at least a portion of the plurality of egress ports 108*a*-108*n* are bundled together to form part of one or more link aggregation groups selected from static link aggregation groups and dynamic link aggregation groups. Both static and dynamic LAGs can detect physical link failures within the LAG and continue forwarding traffic through the other connected links within that same LAG. For example, if a particular egress port e.g., 108*a* fails or becomes congested, the packets in a frame of data may be forwarded using a different port e.g., 108*b*.

Various vendors or standards bodies give these aggregated physical links different names and the aggregated link members may have differences in implementation. The maximum number of members allowed to be in a port channel or a link aggregation group depends on the particular vendor or standard that defines the group. Some link aggregation groups or port channels have up to 8 or 16 compatibly configured egress ports.

For example, as depicted in FIG. 1, in some embodiments, a first link aggregation group 112*a* aggregates the links from egress ports 108*a*, 108*b* to ports 116*a*, 116*b* and a second link aggregation group 112*b* aggregates the links from egress ports 108*m*, 108*n* to 116*m*, 116*n*. In some embodiments, separate port channels or link aggregation groups may be configured between the network switching device 104 and more than one network device such as network device 114. This allows greater flexibility in grouping, partitioning, and efficiently utilizing network switching resources.

Figure 2:
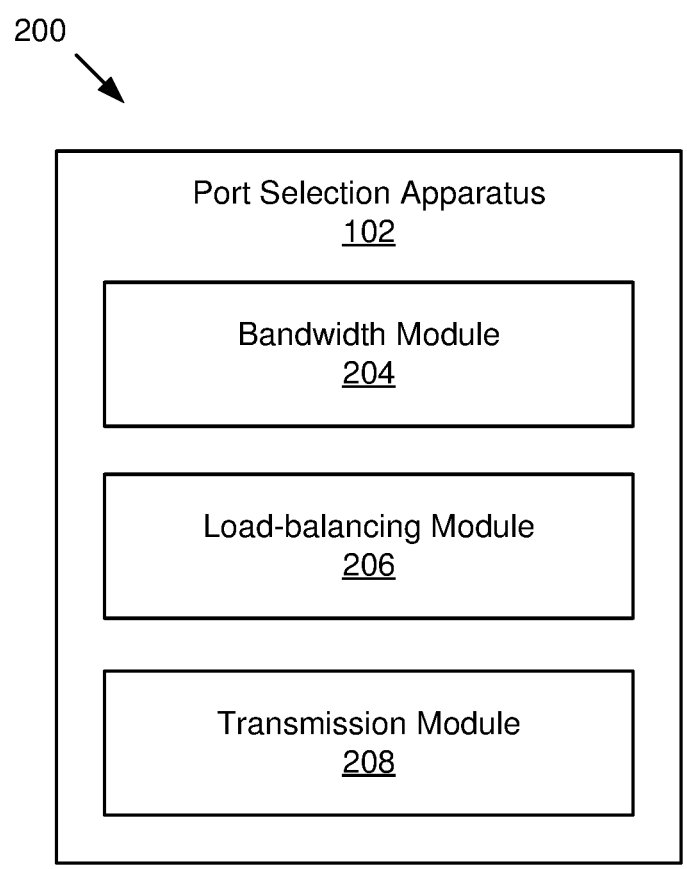
FIG. 2 is a schematic block diagram illustrating one embodiment of a port selection apparatus.

FIG. 2 is a schematic block diagram illustrating one embodiment of a port selection apparatus 102 that provides advanced load balancing based on bandwidth estimation. To understand how the load balancing provided by the port selection apparatus 102 disclosed herein is advanced and represents a significant improvement over existing load balancing solutions, it is helpful to understand some of the problems with various existing solutions.

Many existing load balancing solutions for use with LAGs or port channels use the entropy of the data from the packet header of each packet to help distribute the load (i.e. the packet traffic) as evenly as practical over all of the multiple egress ports included in the LAG or port channel. In this context, entropy is a measure of the uncertainty of the expected value of a given field or fields in the packet header. A hash block is fed with the data from certain fields in the packet header. The hash block then computes a value which is used to select one of the egress ports within the LAG or port channel for transmitting the packet. For example, an Internet Protocol ("IP") packet feeds the hash block packet header data such as a source Media Access Control ("MAC") address, destination MAC, source IP address and destination IP address for computing the egress port to be selected.

User Datagram Protocol ("UDP") packets and Transmission Control Protocol ("TCP") packets feed the hash block packet header data including UDP/TCP source port and UDP/TCP destination port for computing the egress port to be selected. The basic idea of these existing load balancing solutions is that the packet traffic will ideally have enough entropy in the packet header data fed into the hash block so as to select each of the egress ports in the LAG or port channel with sufficient randomness to have a reasonably even distribution of the traffic across the port channel or LAG aggregate members. The various embodiments described below improve load-balancing by adding additional mechanisms beyond entropy-based hashing of packet headers. As described below, these additional elements include optimizing load-balancing based on available bandwidth estimation and providing different packet flows for reorderable packets and non-reorderable packets.

In one embodiment, the bandwidth module 204 is configured to determine a first available bandwidth estimate for a first egress port e.g., 108*a* of the network switching device 104 and to determine a second available bandwidth estimate for a second egress port (e.g., 108*b* . . . 108*m*, 108*n*) of the network switching device 104. As used herein, the term "available bandwidth" with respect to an egress port refers to the availability of a particular egress port to transmit queued packets or frames out quickly enough to avoid having to drop subsequent scheduled to be transmitted using the particular egress port. It may be noted that although the bandwidth of particular network port is traditionally expressed in units of megabits per second or gigabits per second, an available bandwidth estimate as used herein can be any measure or value capable of indicating the availability of sufficient space in a queue to store a packet received at the ingress board at an ingress port (or frame) without the packet (or the frame) being dropped.

In certain embodiments, the bandwidth module 204 is configured to determine the first available bandwidth estimate for the first egress port e.g., 108*a*, or for a particular second port e.g., 108*b* (a fallback port in case the originally first egress port is congested) based on a size of currently available memory in a queue or buffer for the selected port (which could end up being either the first egress port 108*a* or the second egress port 108*b*) at a current rate of packet traffic for the selected port.

In various embodiments, the port selection apparatus 102 and the various modules included in the port selection apparatus 102 such as the bandwidth module 204, the load balancing module 206, and/or the scheduling module 302 (described below with respect to FIG. 3) typically need to operate at very high speeds. Therefore, the available bandwidth estimate can also change very quickly. Accordingly, in some embodiments, the available bandwidth estimate is generated simply and updated quickly based on whether the available space in a buffer memory for the queue corresponding to an individual egress port (e.g., 108*a*) exceeds a predetermined level as explained below with respect to the load balancing module 206. In various embodiments, the bandwidth module 204 communicates the available bandwidth estimate of the schedule port and the different port to the load balancing module 206.

In certain embodiments, the port selection apparatus 102 includes load balancing module 206 that selects the first egress port as a selected port in response to determining that the first available bandwidth estimate of the first egress port exceeds a predetermined level (e.g., the level needed to avoid dropping a packet received at the ingress port which is scheduled to be transmitted via the selected port).

However, assume that the first egress port e.g., 108*a* is congested so that receipt of an additional packet will cause the packet to be dropped. Assume further that the second egress port e.g., 108*b* has no packets in its queue. In this example, the load balancing module 206 selects the second egress port e.g., 108*b* as selected port in response to determining that the available bandwidth estimate of the first egress port 108*a* does not exceed the predetermined level, and that the second available bandwidth estimate of the second egress port 108*b* does exceed the predetermined level. In other words, if the first egress port is congested, the load balancing module determines whether a different port of the plurality of egress ports is not congested.

In some embodiments, the load balancing module 206 goes through various available second egress ports until it finds a second egress port that is not congested. In other embodiments, if more than one second egress port is not congested, the load balancing module selects the second egress port that has the greatest available bandwidth estimate as the selected port. In one embodiment, the load balancing module 206 selects the second egress port by determining which of the plurality of egress ports has the greatest available bandwidth estimate at a receipt time of the packet being received at the ingress port.

In some embodiments, if more than one second egress port is not congested, the load balancing module 206 selects the second egress port by incrementing the port number to the port number of the next available second egress port. In such a case, the load balancing module 206 determines whether the second egress port has an available bandwidth estimate that exceeds the predetermined level required to avoid dropping or causing the packet. If so, then the load balancing module selects the second egress port as the selected port. If not, then the load balancing module 206 increments the port number port number of the next available second egress port and repeats the process. This approach is preferable to existing round-robin approaches because this approach determines whether the available bandwidth estimate for each second egress port exceeds the required predetermined level before selecting the second egress port as the one to transmit the packet.

As a simplified example to illustrate some of the above described embodiments, assume a maximum packet size of 500 bytes and a queue for a first egress port e.g., 108*a* is configured to hold four packets before causing an additional incoming packet to be dropped or held off. In this example, the size of the queue is 2000 bytes. In one embodiment, the first available bandwidth estimate corresponds to the available space in the queue for receiving a packet. So, in the simplified example, assume further that three packets are in the queue during the relevant time period. The first available bandwidth estimate would be the available space in the queue memory which is the size of one packet or 500 bytes. So long as the available bandwidth estimate exceeds the predetermined level of 499 bytes, an additional packet can be received without being dropped or held off. Consequently, the bandwidth module 204 in this example would determine that the first available bandwidth estimate for the first egress port is 500 bytes. Then the load balancing module 206 would select the first egress port e.g., 106*a* as a selected port in response to determining that the available bandwidth estimate e.g., 500 bytes exceeds the predetermined level e.g., 499 bytes.

In a modified example, assume a packet with a small size such as 50 bytes was in the queue along with the three maximum sized packets (500 bytes each) so that a total of 1550 bytes were occupied in the queue by the three max size packets and one small packet. The available bandwidth estimate would then be 450 bytes. Accordingly, the bandwidth module 204 would determine an available bandwidth estimate of 450 bytes for the first egress port 108*a* during the relevant time period and the load balancing module 206 selects the second egress port (e.g., 108*b*) as the selected port in response to determining that the first available bandwidth estimate of the first egress port (e.g., 450 bytes) does not exceed the predetermined level (e.g., 499 bytes).

In some embodiments, the port selection apparatus further includes a transmission module 208 configured to transmit the packet from the selected port. For example, if the load balancing module determines that the first egress port is sufficiently uncongested to be selected as the selected port, the transmission module 208 transmits the packet from the selected port.

In certain embodiments, the bandwidth module 204 is configured to decrease the available bandwidth estimate of the selected port by a packet size of the packet in response to the selected port being selected. In other words, carrying the simplified example above further, when one of the 500 byte packets has been received and is in the queue for a selected egress port (which could be either the first egress port 108a or the second egress port 108b) but the transmission module 208 has not yet transmitted the packet from the selected port, the bandwidth module 204 decreases the available bandwidth estimate of the selected port by the packet size, such as, in the simplified example equal to 500 bytes. Consequently, in the example where the buffer size of the queue was 2000 bytes, the buffer would be completely full, and the available bandwidth estimate would be zero bytes which does not exceed the predetermined level of 499 bytes needed to accommodate receipt of an additional packet without dropping.

Conversely, in some embodiments, the bandwidth module 204 is configured to increase the available bandwidth estimate of the selected port by the packet size of the packet in response to the packet being transmitted from the selected port. In other words, when the transmission module 208 transmits a packet from the egress port which is ultimately selected by the load balancing module 206, the available bandwidth increases by the size of the packet that was transmitted e.g., which in the simplified example equals 500 bytes.

In various embodiments, the port selection apparatus 102 functions as described for devices using a store-and-forward packet switching techniques and also for devices using a cut-through packet switching techniques. In certain embodiments, such as embodiments using cut-through switching, the packet size can be computed by parsing predetermined fields within the packet headers e.g., IEEE 802.3 Service Access Point ("SAP")/Subnetwork Access Protocol ("SNAP"), Ethernet® II length value, IP data length) before scheduling the packet for layer two ("L2") and layer three ("L3") processing.

In some embodiments, the load balancing module 206 is configured to determine whether the packet is configured to use a reliable transport protocol as a condition to selecting the second egress port as the selected port. As used herein, the term "reliable transport protocol" refers to a networking protocol that enables packets which are transmitted out of order by the network switching device to be reordered after the mis-ordered packets are received by another device. In other words, when the load balancing module 206 determines that the available bandwidth estimate for the first egress port does not exceed the predetermined level i.e. the first egress port is congested, as a condition to selecting the second egress port as the selected port, the load balancing module 206 determines whether the packet is configured to use a protocol that allows packet reordering. Some examples of reliable transport protocols include transport control protocol and Transmission Control Protocol ("TCP") and Stream Control Transmission Protocol ("SCTP").

Figure 3:
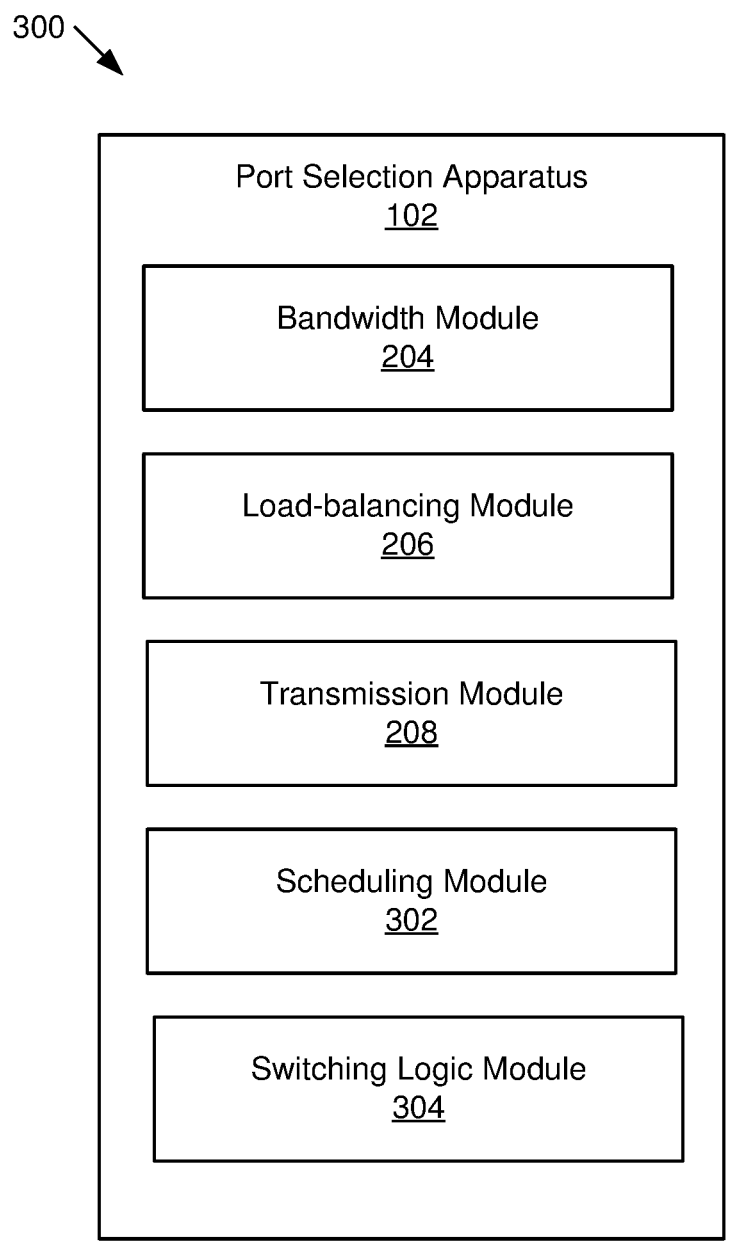
FIG. 3 is a schematic block diagram illustrating another embodiment of a port selection apparatus.

FIG. 3 is a schematic block diagram illustrating one embodiment of another apparatus 300 that includes another embodiment of the port selection apparatus 102 with a bandwidth module 204, a load balancing module 206, and a transmission module 208, which are substantially similar to those of the apparatus 200 of FIG. 2. The apparatus 300, in various embodiments, also includes a scheduling module 302 configured to schedule the first egress port, and a switching logic module 304 configured to cause an action selected from dropping the packet and using flow control to pause receipt of further packets, to be performed in response to one or more of determining that the available bandwidth estimate of first egress port each egress port of a plurality of egress ports including the first egress port and the second egress port does not exceed the predetermined level and/or determining that the packet is not configured to use a reliable transport protocol.

In one embodiment, the port selection apparatus 102 includes a scheduling module 302 configured to schedule a first egress port e.g., 108n of a networking device e.g., 104 for transmitting a packet received at an ingress port e.g., 106 of the network switching device 104. In some embodiments, the scheduling modules is configured to schedule the first egress port using a hash of at least one field of a packet header of the packet. The term "scheduled" port refers to the fact that in advance load balancing, the scheduling module schedules, but does not select an egress port directly based on the hash of the packet header fields as is done in the hash-based load balancing approach described above. Instead, in the scheduling module 302, a hash block determines which of the egress ports 108 is scheduled to be selected on the basis of the application of the hash algorithm to the packet header fields for that particular packet. Once a particular egress port 108n is scheduled by the scheduling module, the load balancing module 206 (described below) performs additional functions to ultimately determine which egress port will be selected to transmit the packet.

Although the scheduling module 302 is capable of scheduling the same egress port e.g., 108n for transmitting all of the packets in a frame received at the ingress port 106, consistently doing so would not efficiently utilize the available bandwidth of the remaining ports e.g., 108a, 108b to 108m. Thus, the scheduling module 302 schedules the first egress port (i.e. egress port 108n) for each packet received at the ingress port 106 so that when the first egress port is congested, the load balancing module can select a different port that is not congested in a way that distributes the packet traffic as evenly as practical among the plurality of egress ports 108a to 108n in the link aggregation group 112.

In some embodiments, the scheduling module 302 is configured to determine which of the plurality of egress ports 108 is the first egress port based on application of the hash algorithm to the packet header fields for that type of packet. The degree of randomness or uncertainty as to the value of bits in the packet header field (also referred to as data entropy), results in the scheduling module 302 selecting different ports for various packets based on different values of the bits in the predetermined locations in the various packet headers. However, in certain networking configurations, packet headers often exhibit patterns of non-randomness, which leads to less than optimal utilization of the available bandwidth of the egress ports 108 and one egress port 108m can become congested while another egress port 108n has access available bandwidth and is therefore underutilized.

In some embodiments, a packet may be forwarded over any one of multiple paths between multiple switching devices such as the network switching device 104. One approach for determining each leg of the path between multiple network switching devices is an Equal Cost Multipath Routing (ECMP) algorithm that tries to balance the load of various possible pathways through the multiple network switching devices 104. In such an algorithm, if the bandwidth utilization of any individual network switching device 104 is suboptimal because one particular egress port e.g., 108a is congested because it is scheduled significantly more frequently than a different egress port e.g., 108b, the computed cost of a path leg that flows through the congested port will increase thus affecting the load balancing. Accordingly, by using the advanced load balancing at the individual network switching device level as described herein for each of the multiple network switching devices 104, a higher level load balancing of multiple network switching devices configured to use ECMP will be improved.

In various embodiments, the scheduling module 302 is configured to use a hashing algorithm or similar approach to determine which egress port e.g., 108a is scheduled. Thereafter, as explained in more detail below, the load balancing module 206 selects either the first egress port e.g., 108a or a different port e.g., 108b taking into account an first available bandwidth estimate determined by the bandwidth module 204 for the first egress port 108a and a second available bandwidth estimate for the second egress port 108b.

The switching logic module 304, in some embodiments, enables packets using a reliable transport protocol to use load balancing and packets not using a reliable transport protocol (i.e. not configured to be re-orderable) to bypass the load balancing. One example of a packet that is not configured to use a reliable transport protocol is a UDP packet. UDP does not insert sequence numbers so the UDP packets are expected to arrive in order or to be dropped or paused using flow control to pause receipt of further packets.

In other words, if the first egress port is congested and the packet is not configured to use a reliable transport protocol (e.g., a UDP packet) that enables the packet to be reordered when it is received, the switching logic module 304 is configured to either cause the packet to be dropped or paused using flow control, rather than transmitting the packet over one of the different ports which could cause the packet to be mis-ordered without a mechanism for reordering the packets.

Thus, in various embodiments, instead of using the same hash based load balancing flow for all types of packets, the port selection apparatus 102 uses advanced load balancing that includes using hash block for determining a scheduled egress port, available bandwidth estimates for determining a second egress port within the link aggregation group if the first egress port is congested, and a drop/flow control approach for non-reorderable packets. Accordingly, the port selection apparatus 102 enables both reorderable and non-reorderable packets to each be handled efficiently with a suitable switching flow and, in the case of reorderable packets, to be handled with more optimal load balancing than is achievable by merely load balancing based on data entropy using a hash of packet header fields to select the selected egress port.

Figure 4:
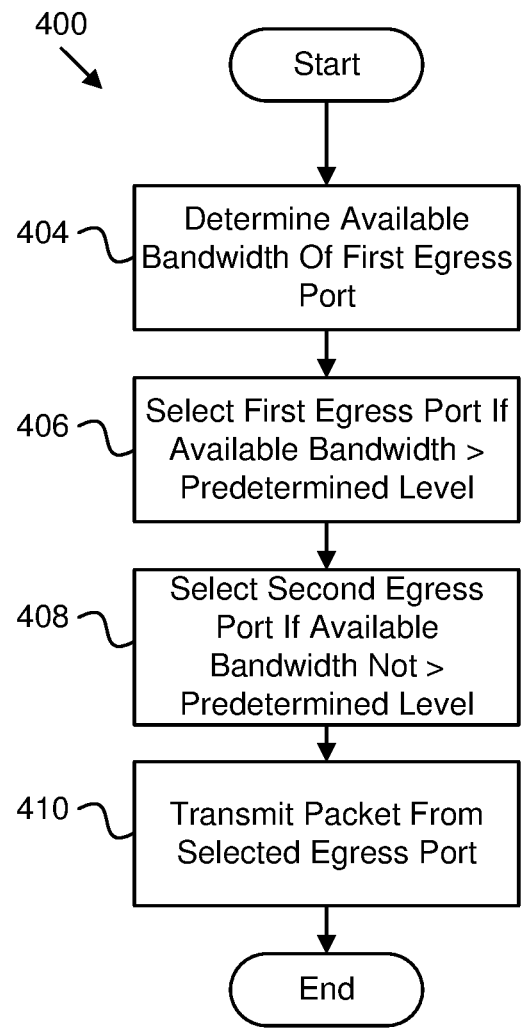
FIG. 4 is a schematic flow chart diagram illustrating one embodiment of a method for advanced load balancing based on bandwidth estimation.

FIG. 4 is a schematic flow chart diagram illustrating one embodiment of a method 400 for advanced load balancing based on bandwidth estimation. The method 400 begins and schedules 402 a first egress port of a plurality of egress ports of a networking device for transmitting a packet received an ingress port of the networking device.

The method 400 determines 404 an available bandwidth of the scheduled port. As explained above with respect to apparatuses 200 and 300 as depicted respectively in FIGS. 2 and 3, the first egress port may or may not become the selected port depending on whether the first egress port has enough available bandwidth i.e. is not congested.

The method 400 selects 406 the first egress port as a selected port in response to determining that the available bandwidth estimate of the first egress port exceeds a predetermined level. The predetermined level is such that an additional packet or packets may be received by the ingress port and either be transmitted out the egress port within a specified time or stored in a buffer or queue corresponding to the egress port. Method 400 continues and selects 408 a second egress port as a selected port in response to determining that the available bandwidth estimate of the first egress port does not exceed the predetermined level and wherein the second egress port has a second available bandwidth estimate that exceeds the predetermined level. The method 400 transmits 410 the selected port and the method 400 ends.

Figure 5:
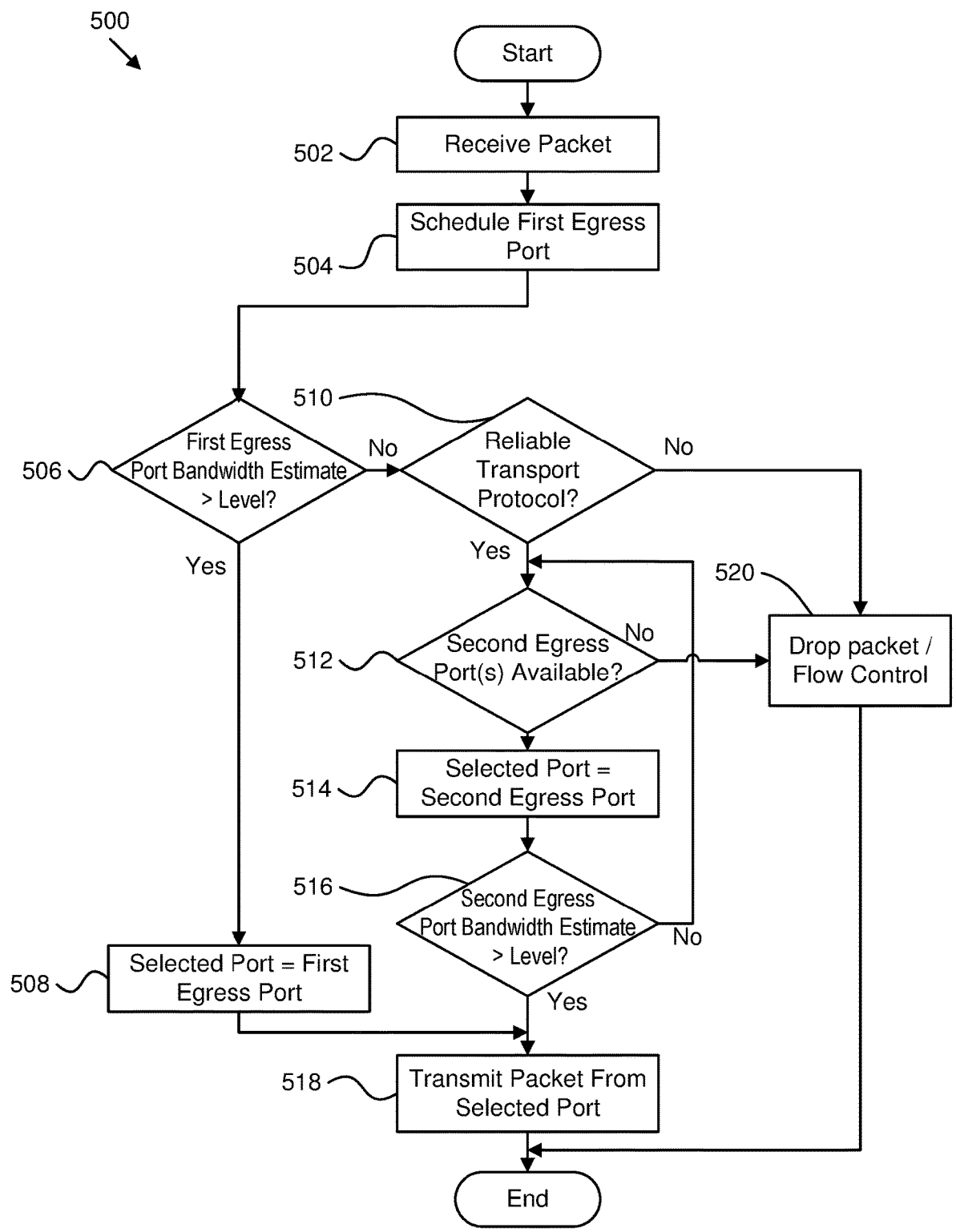
FIG. 5 is a schematic flow chart diagram illustrating another embodiment of a method for advanced load balancing based on bandwidth estimation.

FIG. 5 is a schematic flow chart diagram illustrating another embodiment of a method 500 for advanced load balancing based on bandwidth estimation. The method 500 starts and receives 502 a packet at an ingress port of a networking device. The method schedules 504 a first egress port of a plurality of egress parts of the network device for transmitting the packet received the ingress port. Determining 504 the first egress port may be done substantially as described above where the first egress port is determined by applying a hashing algorithm to certain fields of a packet header for the packet. However, in various embodiments, any method of determining the first egress port can be used at this stage of the method. For example, in some embodiments, the first egress port is determined by a round-robin scheduling approach followed by other steps of method 500 for selecting a different egress port to transmit the packet if the scheduled egress port is congested.

In various embodiments, the method 500 determines 506 whether an available bandwidth estimate for the first egress port exceeds a predetermined level. For example, in some embodiments, the available bandwidth estimate is based on the amount of buffer or queue space available to receive a packet and start to memory in a store-and-forward switching strategy. In other embodiments, such as for example, in a cut-through switching strategy, the available bandwidth estimate is a measure that determines whether the first egress port can complete transmission of an outgoing packet in time to begin transmitting the received packet without storing the packet to a buffer or queue. If the available bandwidth estimate exceeds the predetermined level, then the method 500 selects 508 the first egress port as the selected port and transmits 518 the packet from the selected port and the method 500 ends.

If the first available bandwidth estimate of the first egress port does not exceed the predetermined level, then the method 500 determines 510 whether the packet is configured to use a reliable transport protocol. As explained above, TCP and SCTP packets are both configured to use reliable transport protocols where as UDP packets are not, where using a reliable transport protocol means that the packets may be transmitted out of order and reordered at a receiving device. If the packet is not configured to use a reliable transport protocol, then the method 500 performs 520 one of dropping the packet and pausing receipt of further packets using flow control and the method 500 ends without performing load balancing by transmitting the packet from a second egress port rather than the first egress port.

If the first egress port is congested (e.g., the first available bandwidth estimate does not exceed the predetermined level) and the packet is configured to use a reliable transport protocol (e.g., the packet is reorderable), the method 500 determines 512 whether one or more second egress ports are available. If one or more second egress ports are not available, the method 500 performs 520 one of dropping the packet and pausing receipt of packets using flow control and the method 500 ends.

If the method 500 determines 512 that one or more second egress ports are available, then the method 500 selects 514 the second egress port as the selected port and determines 516 whether the available bandwidth estimate for the second egress port exceeds the predetermined level, using any of the techniques described above for determining an available bandwidth estimate. If the available bandwidth estimate for the second egress port does not exceed the predetermined level i.e. if the currently selected second egress port is congested, the method 500 returns again to determine 512 whether one or more next second egress ports are available, and the method repeats as described above until a second egress port with sufficient bandwidth is determined i.e. a second egress port whose available bandwidth estimate exceeds the predetermined level.

If the second egress port is not congested i.e. the available bandwidth estimate for the second egress port exceeds the predetermined level required for transmitting the packet as described above, the method 500 transmits 518 the packet from the selected port in the method ends. All or portions of the steps of the method 500 may be implemented using the scheduling module 302, the bandwidth module 204, the load balancing module 206, the transmission module 208 and/or the switching logic module 304.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

In one embodiment, a network switching device includes one or more ingress ports, switching logic, switch fabric, a plurality of egress ports of which at least two are members of a link aggregation group. In various embodiments, the network switching device further includes a circuit configured to receive a networking packet, a circuit configured to schedule a first egress port of egress ports that are members of the link aggregation group for transmitting the networking packet. In some embodiments, the network switching device includes a circuit configured to determine an available bandwidth estimate of the scheduled port. In certain embodiments, the network switching device includes a circuit configured to select the first egress port as a selected port in response to determining that the available bandwidth estimate of the first egress port exceeds a predetermined level.

In one embodiment, the network switching device further includes a circuit configured to select a second egress port from the plurality of egress ports that are members of the link aggregation group as a selected port in response to determining that the available bandwidth estimate of the first egress port does not exceed the predetermined level, the different part having a second available bandwidth estimate that exceeds the predetermined level. In one embodiment, the network switching device further includes a circuit configured to transmit the packet from the selected port.

In various embodiments, the above described circuits of the network switching device may form at least a portion of the scheduling module 302, the bandwidth module 204, the load balancing module 206, the transmission module 208 and/or the switching logic module 304 substantially as described above with respect to the apparatus 200 and 300 substantially as described above with respect to FIGS. 2 and 3. Moreover, the above described ingress ports, switching logic, switch fabric, and plurality of egress ports of which at least two are members of the link aggregation group as well as the circuits of the network switching device may perform one or more of the steps of the methods 400 and 500 substantially as described above with respect to FIGS. 4 and 5.

What is claimed is:

1. An apparatus for a network switching device, the apparatus comprising:
    a scheduling circuit configured to schedule an egress port from a plurality of egress ports using a hash of at least one field of a packet header of a packet, wherein the packet is scheduled to be transmitted from a first egress port based on the hash;
    a bandwidth circuit configured to determine a first available bandwidth estimate for the first egress port of the network switching device and to determine a second available bandwidth estimate for a second egress port of the network switching device, wherein bandwidth comprises a measure indicative of capacity of a queue of an egress port;
    a load balancing circuit configured to select the first egress port as a selected port in response to determining that the first available bandwidth estimate of the first egress port exceeds a first predetermined level, the first predetermined level relative to a capacity of a queue of the first egress port, and to select the second egress port as the selected port in response to determining that the first available bandwidth estimate of the first egress port does not exceed the first predetermined level and that the second available bandwidth estimate of the second egress port exceeds a second predetermined level, the second predetermined level relative to a capacity of a queue of the second egress port; and
    a transmitter transmission module configured to transmit the packet from the selected port.

2. The apparatus of claim 1, wherein the load balancing circuit is configured to determine whether the packet is configured to use a reliable transport protocol as a condition to selecting the second egress port as the selected port.

3. The apparatus of claim 2, wherein the reliable transport protocol is one of Transmission Control Protocol ("TCP") and Stream Control Transmission Protocol ("SCTP").

4. The apparatus of claim 1, further comprising a switching logic circuit configured to cause an action selected from dropping the packet and using flow control to pause receipt of further packets, to be performed in response to one or more of determining that the available bandwidth estimate of each egress port of the plurality of egress ports including the first egress port and the second egress port does not exceed a predetermined level applicable to the corresponding egress port and/or determining that the packet is not configured to use a reliable transport protocol.

5. The apparatus of claim 1, wherein the bandwidth circuit is configured to determine the available bandwidth estimate for the selected port based on a size of currently available memory in a queue for the selected port at a current rate of packet traffic for the selected port.

6. The apparatus of claim 5, wherein the bandwidth circuit is configured to decrease the available bandwidth estimate of the selected port by a packet size of the packet in response the selected port being selected.

7. The apparatus of claim 5, wherein the bandwidth circuit is configured to increase the available bandwidth estimate of the selected port by a packet size of the packet in response to the packet being transmitted from the selected port.

8. The apparatus of claim 7, wherein the bandwidth circuit is configured to determine the packet size by parsing a packet header of the packet before scheduling the packet for layer 2 or layer 3 processing.

9. The apparatus of claim 1, wherein the load balancing circuit is configured to select the second egress port as the selected port by determining which of the plurality of egress ports has the greatest available bandwidth estimate at a receipt time of the packet being received at an ingress port.

10. The apparatus of claim 1, wherein the load balancing circuit is configured to determine the second egress port by incrementing a port number to the port number of a next available egress port whose available bandwidth estimate exceeds a predetermined level applicable to the next available egress port.

11. The apparatus of claim 1, wherein the plurality of egress ports are bundled together to form a link aggregation group selected from a static link aggregation group and a dynamic link aggregation group.

12. A method comprising:
receiving a packet at an ingress port of a network switching device;
schedule the packet to be transmitted from a first egress port of a plurality of egress ports based on a hash of at least one field of a header of the packet;
determining a first available bandwidth estimate of the first egress port, wherein bandwidth comprises a measure indicative of capacity of a queue of an egress port;
selecting the first egress port as a selected port in response to determining that the first available bandwidth estimate of the first egress port exceeds a first predetermined level, the first predetermined level relative to a capacity of a queue of the first egress port;
selecting a second egress port as the selected port in response to determining that the first available bandwidth estimate of the first egress port does not exceed the first predetermined level and to further determining that the second egress port has a second available bandwidth estimate that exceeds a second predetermined level, the second predetermined level relative to a capacity of a queue of the second egress port; and
transmitting the packet from the selected port.

13. The method of claim 12, further comprising causing an action selected from dropping the packet and using flow control to pause receipt of further packets, to be performed in response to one or more of determining that the available bandwidth estimate of each egress port of the plurality of egress ports including the first egress port and the second egress port does not exceed a predetermined level applicable to the corresponding egress port and/or determining that the packet is not configured to use a reliable transport protocol.

14. The method of claim 12, wherein determining the available bandwidth estimate for the selected port is based on a size of currently available memory in a queue for the selected port at a current rate of packet traffic for the selected port.

15. The method of claim 14, further comprising decreasing the available bandwidth estimate of the selected port by a packet size of the packet in response to the selected port being selected.

16. The method of claim 14, further comprising increasing the available bandwidth estimate of the selected port by a packet size of the packet in response to the packet being transmitted from the selected port.

17. The method of claim 12, further comprising selecting the second egress port by determining which of the plurality of egress ports including the first egress port and the second egress port has the greatest available bandwidth estimate at a receipt time of the packet being received at the ingress port.

18. The method of claim 12, further comprising selecting the second egress port by incrementing a port number to the port number of a next available egress port.

19. A network switching device comprising:
an ingress port;
a plurality of egress ports;
a first circuit configured to receive a networking packet and to schedule the networking packet to be transmitted from a first egress port based on a hash of at least one field of a header of the networking packet;
a second circuit configured to configure the plurality of egress ports as members of a link aggregation group;
a third circuit configured to determine a first available bandwidth estimate of a first egress port of the plurality of egress ports, wherein bandwidth comprises a measure indicative of capacity of a queue of an egress port;
a fourth circuit configured to select the first egress port as a selected port in response to determining that the first available bandwidth estimate of the first egress port exceeds a first predetermined level, the first predetermined level relative to a capacity of a queue of the first egress port;
a fifth circuit configured to select a second egress port from the plurality of egress ports as the selected port in response to determining that the first available bandwidth estimate of the first egress port does not exceed the first predetermined level, the second egress port having a second available bandwidth estimate that exceeds a second predetermined level, the second predetermined level relative to a capacity of a queue of the second egress port; and
a sixth circuit configured to transmit the networking packet from the selected port.

* * * * *